(12) United States Patent
Fan et al.

(10) Patent No.: US 9,083,862 B2
(45) Date of Patent: Jul. 14, 2015

(54) BIOSENSOR WITH A VISUALLY IDENTIFIABLE CHARACTER PATTERN, AND BIOSENSOR MEASURING SYSTEM INCORPORATING THE SAME

(75) Inventors: Li-Ren Fan, Taichung (TW); Wen-Feng Chung, Taichung (TW)

(73) Assignee: BIONIME CORPORATION, Taichung (TW)

( * ) Notice: Subject to any disclaimer, the term of this patent is extended or adjusted under 35 U.S.C. 154(b) by 433 days.

(21) Appl. No.: 13/558,504

(22) Filed: Jul. 26, 2012

(65) Prior Publication Data

US 2013/0050459 A1 Feb. 28, 2013

(30) Foreign Application Priority Data

Aug. 29, 2011 (TW) .............................. 100130903 A

(51) Int. Cl.
*A61B 1/04* (2006.01)
*H04N 7/18* (2006.01)

(52) U.S. Cl.
CPC ..................................... *H04N 7/183* (2013.01)

(58) Field of Classification Search
USPC ...................... 348/77; 205/775, 777; 204/403
See application file for complete search history.

(56) References Cited

U.S. PATENT DOCUMENTS

| 6,217,744 | B1 * | 4/2001 | Crosby .......................... 205/775 |
| 6,416,959 | B1 * | 7/2002 | Giuliano et al. ............... 435/7.2 |
| 7,695,608 | B2 * | 4/2010 | Kim et al. ..................... 205/775 |
| 7,780,827 | B1 * | 8/2010 | Bhullar et al. ........... 204/403.02 |
| 8,757,496 | B2 * | 6/2014 | Watanabe ..................... 235/469 |
| 2014/0262828 | A1 * | 9/2014 | Iyengar et al. ............. 205/777.5 |

FOREIGN PATENT DOCUMENTS

TW 201015064 A 4/2010

* cited by examiner

*Primary Examiner* — Paulos M Natnael
(74) *Attorney, Agent, or Firm* — Pepper Hamilton LLP

(57) ABSTRACT

In a biosensor measuring system, a biosensor includes a bio-sensing unit embedded in a main body formed with a visually identifiable character pattern that corresponds to identification information associated with the biosensor. A biosensor measuring device includes an image capturing unit for capturing an image of the character pattern. An image processing unit identifies the captured image to obtain identification data, which is displayed on a display unit. A signal processing unit analyzes a reactive signal generated by the bio-sensing unit and associated with a specific component in a test sample based on an input signal, which is generated by an input unit when the displayed identification data matches the character pattern, to obtain a measurement result.

4 Claims, 4 Drawing Sheets

US 9,083,862 B2

BIOSENSOR WITH A VISUALLY IDENTIFIABLE CHARACTER PATTERN, AND BIOSENSOR MEASURING SYSTEM INCORPORATING THE SAME

CROSS-REFERENCE TO RELATED APPLICATION

This application claims priority to Taiwanese Application No. 100130903, filed on Aug. 29, 2011.

BACKGROUND OF THE INVENTION

1. Field of the Invention

The invention relates to a biosensor, and more particularly to a biosensor with a visually identification character pattern, and a biosensor measuring system incorporating the same.

2. Description of the Related Art

Generally, a conventional biosensor is formed with an optically readable pattern, such as one-dimensional or two-dimensional barcodes as disclosed in Taiwanese Publication Application No. 201015064, and infrared absorption/reflection marks as disclosed in U.S. Pat. No. 7,695,608. The optically readable pattern is read by an optical reader of a corresponding biosensor measuring device so as to obtain identification information associated with the conventional biosensor, for example, product type number, product lot number, etc. In use, if the corresponding biosensor measuring device has a mistake on reading of the identification information of the conventional biosensor for some reasons, for example, malfunction of the corresponding biosensor measuring device, an error in a measurement result generated by the corresponding biosensor measuring device occurs. In addition, the optically readable pattern on the conventional biosensor cannot be identified by a user, thereby resulting in inconvenience.

Another conventional biosensor is formed with a plurality of through holes by punch. Ones of the through holes at different predetermined positions are filled respectively with a plurality of sensing pieces such that the predetermined through holes filled with the sensing pieces constitute an identification pattern corresponding to identification information associated with the conventional biosensor. Since the sensing pieces are manually filled into said ones of the through holes, it takes much time to fabricate such biosensor. In addition, a corresponding biosensor measuring device must include a sensing mechanism for sensing the sensing pieces in such sensor to obtain the identification information.

Therefore, improvements may be made to the above techniques.

SUMMARY OF THE INVENTION

Therefore, an object of the present invention is to provide a biosensor with a visually identifiable character pattern, and a biosensor measuring system incorporating the same that can overcome the aforesaid drawbacks of the prior art.

According to one aspect of the present invention, there is provided a biosensor for sensing a specific component in a test sample. The biosensor comprises:

a main body having a side surface formed with a visually identifiable character pattern corresponding to identification information associated with the biosensor; and a bio-sensing unit embedded in the main body, and adapted to receive the test sample so as to sense the specific component in the test sample to thereby generate a reactive signal associated with the specific component in the test sample.

According to another aspect of the present invention, there is provided a biosensor measuring system for measuring a specific component in a test sample. The biosensor measuring system comprises:

a biosensor including
 a main body having a side surface formed with a visually identifiable character pattern corresponding to identification information associated with the biosensor, and
 a bio-sensing unit embedded in the main body adapted to receive the test sample so as to sense the specific component in the test sample to thereby generate a reactive signal associated with the specific component in the test sample; and a biosensor measuring device including
 a housing formed with an insertion groove permitting insertion of the main body of the biosensor thereinto,
 a display unit mounted on the housing,
 an image capturing unit disposed in the housing for capturing an image of the visually identifiable character pattern upon insertion of the main body of the biosensor into the insertion groove in the housing,
 an image processing unit connected electrically to the image capturing unit and the display unit, and receiving the captured image from the image capturing unit, the image processing unit being configured to identify a character portion included in the captured image to obtain identification data corresponding to the character portion, and outputting the identification data to the display unit such that the identification data is displayed on the display unit,
 an input unit operable to generate an input signal when the identification data displayed on the display unit matches the visually identifiable character pattern on the side surface of the main body of the biosensor, and
 a signal processing unit connected electrically to the display unit, the image processing unit and the input unit, receiving the identification data from the image processing unit and the input signal from the input unit, and connected electrically to the bio-sensing unit of the biosensor when the main body of the biosensor is inserted into the insertion groove in the housing for receiving the reactive signal therefrom, the signal processing unit being configured to analyze the reactive signal based on the input signal and the identification data to obtain a measurement result corresponding to the specific component in the test sample and displayed on the display unit.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENT

Figure 1:
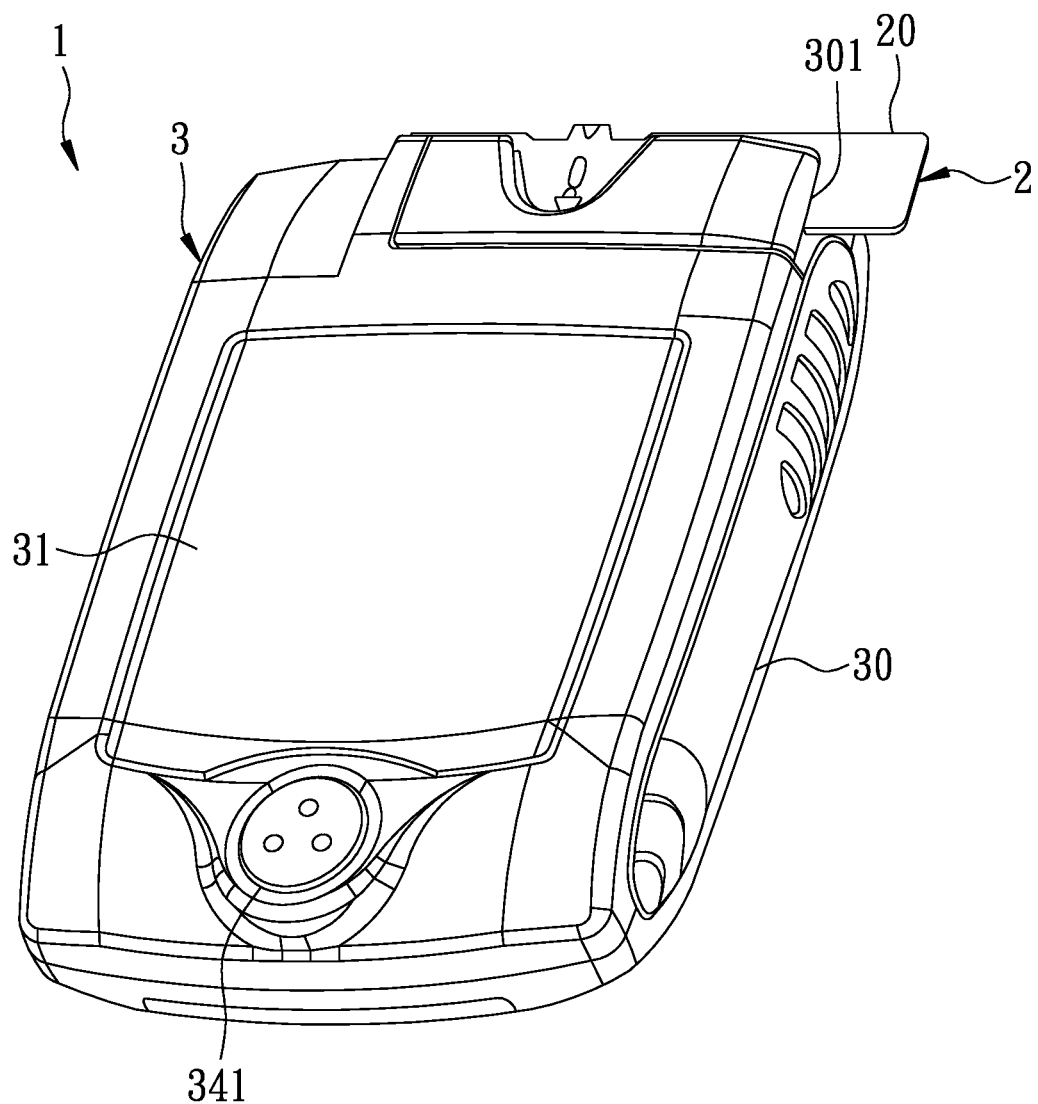
FIG. 1 is a perspective view showing the preferred embodiment of a biosensor measuring system according to the present invention.
Figure 2:
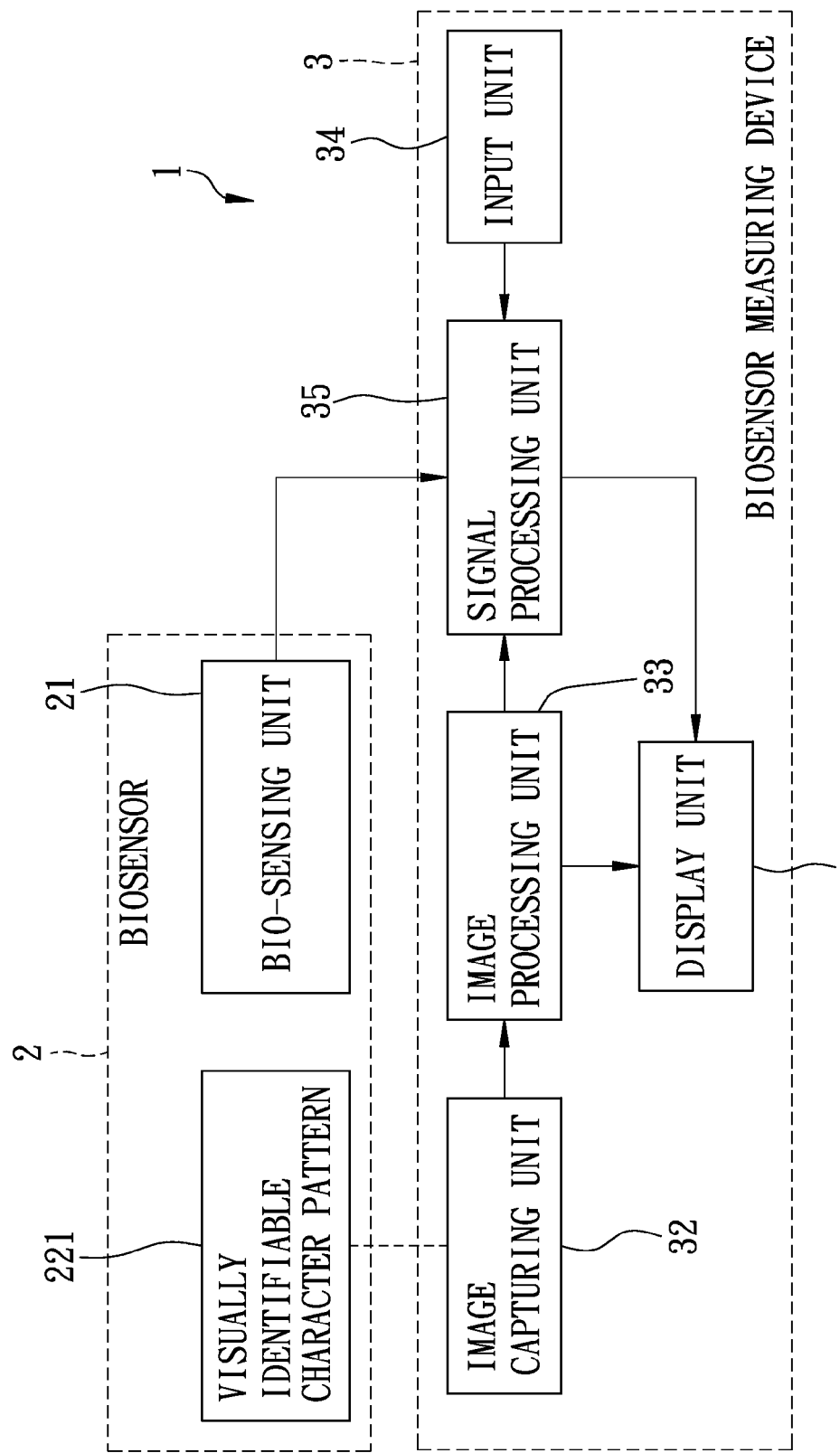
FIG. 2 is a schematic circuit block diagram illustrating the preferred embodiment.

Referring to FIGS. 1 and 2, the preferred embodiment of a biosensor measuring system for measuring a specific component in a test sample (not shown) according to the present invention is shown to include a biosensor 2, and a biosensor measuring device 3. In this embodiment, the specific component in the test sample is glucose or cholesterol in a blood sample.

Figure 3:
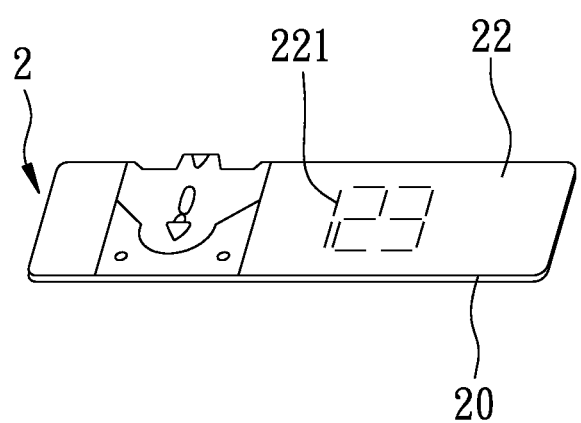
FIG. 3 is a perspective view showing a biosensor of the preferred embodiment.

Referring further to FIG. 3, the biosensor 2 includes a strip-type main body 20, and a bio-sensing unit 21.

The main body 20 has a side surface 22 formed with a visually identifiable character pattern 221 corresponding to identification information, for example, product type number and product lot number, associated with the biosensor 2. In this embodiment, the visually identifiable character pattern 221 is formed by printing or carving. In addition, the visually identifiable character pattern 221 includes a series of characters, each of which is a numeral, to form an identification code corresponding to the biosensor 2. In other embodiments, each character of the visually identifiable character pattern 221 can be a letter.

The bio-sensing unit 21 is embedded in the main body 20 (not shown in FIG. 3), and is adapted to receive the test sample so as to sense the specific component in the test sample to thereby generate a reactive signal associated with the specific component in the test sample. Since the feature of this invention does not reside in the configuration of the bio-sensing unit 21, which is known to those skilled in the art, details of the same are omitted herein for the sake of brevity.

The biosensor measuring device 3 includes a housing 30, a display unit 31, an image capturing unit 32, an image processing unit 33, an input unit 34, and a signal processing unit 35.

The housing 30 is formed with an insertion groove 201 permitting insertion of the main body 20 of the biosensor 2 thereinto, as shown in FIG. 1.

The display unit 31 is mounted on the housing 30.

The image capturing unit 32 is disposed in the housing 30 for capturing an image of the visually identifiable character pattern 221 upon insertion of the main body 20 of the biosensor 2 into the insertion groove 201 in the housing 30.

The image processing unit 33 is connected electrically to the image capturing unit 32 and the display unit 31, and receives the captured image from the image capturing unit 32. The image processing unit 33 is configured to identify a character portion included in the captured image to obtain identification data corresponding the character portion, and outputs the identification data to the display unit 31 such that the identification data is displayed on the display unit 31.

The input unit 34 is operable to generate an input signal when the identification data displayed on the display unit 31 matches the visually identifiable character pattern 221 on the main body 20 of the biosensor 2. In this embodiment, the input unit 34 includes a press button 341 (see FIG. 1), which is pressed by a user after it is determined by the user that the identification data displayed on the display unit 31 matches the visually identifiable character pattern 221 on the main body 20 of the biosensor 2 to thereby generate the input signal.

It is noted that, in other embodiments, the display unit 31 and the input unit 34 can be combined into a touch display panel.

The signal processing unit 35 is connected electrically to the display unit 31, the image processing unit 33 and the input unit 34, and receives the identification data from the image processing unit 33 and the input signal from the input unit 34. When the main body 20 is inserted into the insertion groove 301 in the housing 30, the signal processing unit 35 is further connected electrically to the bio-sensing unit 21 of the biosensor 2 for receiving the reactive signal therefrom. The signal processing unit 35 is configured to analyze the reactive signal based on the input signal and the identification data in a known manner to obtain a measurement result corresponding to the specific component in the test sample and displayed on the display unit 31.

Figure 4:
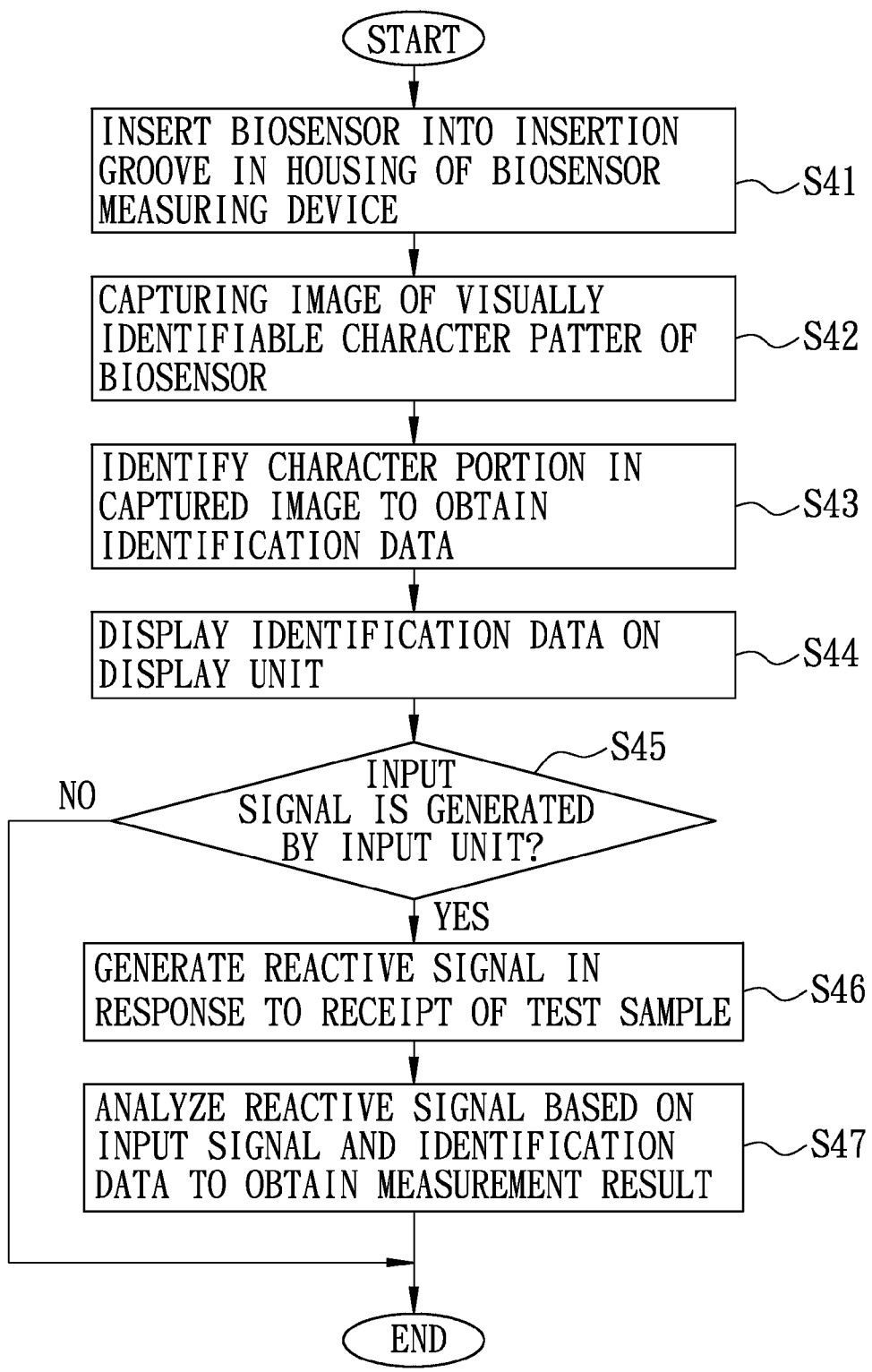
FIG. 4 is a flow chart illustrating how to measure a specific component in a test sample using the preferred embodiment.

FIG. 4 is a flow chart illustrating how to measure a specific component in a test sample using the biosensor measuring system of the present invention.

In step S41, the main body 20 of the biosensor 2 is inserted into the insertion groove 301 in the housing 30 of the biosensor measuring device 3. In this case, the bio-sensing unit 21 of the biosensor 2 is connected electrically to the signal processing unit 35 of the biosensor measuring device 3.

In step S42, the image capturing unit 32 captures an image of the visually identifiable character pattern 221 on the main body 20 of the biosensor 2.

In step S43, the image processing unit 33 identifies a character portion included in the captured image to obtain identification data corresponding to the character portion.

In step S44, the identification data is displayed on the display unit 31. Therefore, the user can judge whether the biosensor measuring device 3 is in a normal state by comparing the displayed identification data and the visually identifiable character pattern on the main body 20 of the biosensor 2, i.e., by determining whether the displayed identification data matches the visually identifiable character pattern on the main body 20 of the biosensor 2. For example, the visually identifiable character pattern a series of numerals indicated by "123" (see FIG. 3). When the identification data displayed on the display unit 31 also indicates "123", a match is detected by the user.

In step S45, it is determined whether the input unit 34 generates an input signal in response to operation by the user. If the result is affirmative, the flow goes to step S46. In this case, since the user has determined that the displayed identification data matches the visually identifiable character pattern on the main body 20 of the biosensor 2, the user thus operates the input unit 34 to generate the input signal. Otherwise, the flow is terminated. In other words, when the displayed identification data does not match the visually identifiable character pattern on the main body 20 of the biosensor 2, the bio-sensor measuring device 3 is abnormal, thereby terminating measurement operation.

In step S46, the test sample, such as a blood sample, is received by the bio-sensing unit 21 of the biosensor 2 such that the bio-sensing unit 21 generates a reactive signal associated with the specific component of the test sample and outputs the reactive signal to the signal processing unit 35 of the biosensor measuring device 3.

In step S47, the signal processing unit 35 analyzes the reactive signal from the bio-sensing unit 21 of the biosensor 2 based on the identification data and the input signal to obtain a measurement result corresponding to the specific component in the test sample. The measurement result is displayed on the display unit 31.

In sum, the visually identifiable character pattern 221 on the main body 20 of the biosensor 2 is easily recognized by the user, thereby resulting in convenience during use. On the other hand, since the visually identifiable pattern 221 of the biosensor 2 includes a series of the characters consisting of numerals or/and letters formed by printing or carving, the biosensor 2 can be easily fabricated and configured to indicate relatively more identification information as compared to the conventional biosensor with the through holes and the sensing pieces. In addition, the user can easily judge whether the biosensor measuring device 3 is in the normal state by comparing the displayed identification data and the visually identifiable character pattern 221. On the other words, measurement operation does not start until it is checked that the biosensor is recognized by the biosensor measuring device 3 in the normal state. Therefore, the biosensor measuring system 1 of this invention can ensure a correct measurement result.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A biosensor measuring system for measuring a specific component in a test sample, comprising
- a biosensor including
  - a main body having a side surface formed with a visually identifiable character pattern corresponding to identification information associated with said biosensor, and
  - a bio-sensing unit embedded in said main body adapted to receive the test sample so as to sense the specific component in the test sample to thereby generate a reactive signal associated with the specific component in the test sample; and
- a biosensor measuring device including
  - a housing formed with an insertion groove permitting insertion of said main body of said body thereinto,
  - a display unit mounted on said housing,
  - an image capturing unit disposed in said housing for capturing an image of said visually identifiable character pattern upon insertion of said main body of said biosensor into said insertion groove in said housing,
  - an image processing unit connected electrically to said image capturing unit and said display unit, and receiving the captured image from said image capturing unit, said image processing unit being configured to identify a character portion included in the captured image to obtain identification data corresponding to the character portion, and outputting the identification data to said display unit such that the identification data is displayed on said display unit,
  - an input unit operable to generate an input signal when the identification data displayed on said display unit matches the visually identifiable character pattern on said side surface of said main body of said biosensor, and
  - a signal processing unit connected electrically to said display unit, said image processing unit and said input unit, receiving the identification data from said image processing unit and the input signal from said input unit, and connected electrically to said bio-sensing unit of said biosensor when said main body of said biosensor is inserted into said insertion groove in said housing for receiving the reactive signal and the identification data to obtain a measurement result corresponding to the specific component in the test sample and displayed on said display unit.

2. The biosensor measuring system as claimed in claim 1, wherein said visually identifiable character pattern includes at least one character.

3. The biosensor measuring system as claimed in claim 2, wherein the character is one of a numeral and a letter.

4. The biosensor measuring system as claimed in claim 2, wherein said visually identifiable character pattern includes a series of the characters to form an identification code corresponding to said biosensor.

\* \* \* \* \*